United States Patent Office 3,629,230
Patented Dec. 21, 1971

3,629,230
QUATERNIZATION WITH ALKYLENE OXIDES
Bjorn Gunnar Folke Soderqvist, Uppsala, Sweden, assignor to Pharmacia Fine Chemicals AB, Uppsala, Sweden
No Drawing. Continuation-in-part of abandoned application Ser. No. 539,572, Apr. 1, 1966. This application Sept. 10, 1969, Ser. No. 856,815
Claims priority, application Sweden, Apr. 2, 1965, 4,254/65
Int. Cl. C08b 19/08, 29/28
U.S. Cl. 260—209 D
7 Claims

ABSTRACT OF THE DISCLOSURE

Novel method for producing quaternization products of amino group-substituted cellulose and of amino group-substituted hydrophilic, water-swellable and water-insoluble copolymerizates of polyhydroxy compounds with bifunctional substances. These quaternization products have a high degree of quaternization, preferably amounting to at least about 80 percent. The novel products are preferably, but not solely, intended for use in grain form for ion-exchange chromatography.

RELATED CASE

The application is a continuation-in-part of application Ser. No. 539,572 filed on Apr. 1, 1966.

BACKGROUND

It is previously known to introduce diethylaminoethyl groups in cellulose, whereby products suitable for use in ion-exchange chromatography are obtained (Journal of the American Chemical Society 78 (1956), pages 751–755). A disadvantage with the thus produced ion-exchangers, which in many respects are outstanding, is that they cannot be obtained with an ion-exchange capacity as high as desired. If the ion-exchanging groups are introduced in the cellulose to a substitution degree corresponding to an ion-exchange capacity of more than approximately 1 milliequivalent per gram (1 meq. per gram), the obtained products have unfavourable physical properties. This disadvantage can be avoided if, rather than the cellulose, a hydrophilic water swellable and water insoluble copolymerization of a polyhydroxy compound (such as dextran) with a bifunctional compound (such as epichlorohydrin) is used as starting material for the reaction to introduce the diethylaminoethyl groups. Ion-exchangers which have good physical properties reaching a substitution degree corresponding to an ion-exchange capacity of approximately 6 meq. per gram (British Pat. No. 936,039) can be obtained from such copolymerizates.

Common to both the above mentioned types of ion exchangers is the fact that they cannot be used for chromatography under too alkaline conditions, which may be understood as a pH-value of more than approximately 9. At pH-values above approximately 9 the known ion-exchangers lose their charge which is necessary for their use as separation mediums. In order to obtain ion-exchangers which could also be used above a pH-value of approximately 9 attempts have been made to treat the amino group-substituted ion-exchangers with quaternizing agents for converting the amino-groups into quaternary ammonium groups. In this context, it can be mentioned that quaternization of diethylaminoethyl-substituted cellulose with ethyl-bromide has previously been described (Arkiv for kemi 11 (1957), page 97). In British Pat. 936,039 it is stated that, for example, copolymerizates of dextran with epichlorohydrin, which are substituted with diethylaminoethyl groups can be treated with alkyl halides to transfer the polymers into corresponding alkyldiethylammonium group-substituted compounds.

I have carried out tests for the purpose of producing products of quaternization in accordance with the teachings of the art described above. Titration graphs obtained with such quaternization products of amino group-substituted cellulose indicate that the conversion into quaternary ammonium groups has been low. Similarly I have been able to establish an incomplete quaternization in the reaction of ethyl bromide with diethylaminoethyl group-substituted copolymerizates of polyhydroxy compounds with bifunctional substances of the type which are described in the above mentioned British patent. Thus the conclusions to be drawn herefrom are that hitherto it has not been possible to produce quaternization products having a degree of quaternization exceeding approximately 50%. The relatively low degree of quaternization of the above mentioned anion-exchangers implies that, in the chromatography of substance mixtures at a pH-value exceeding approximately 9, only part of the ion-exchanging groups, namely the quaternized groups can be used. This is naturally a very serious disadvantage.

THE PRESENT INVENTION

According to the present invention I have discovered that the disadvantages and shortcomings of products produced by following the above mentioned known quaternization methods can be substantially reduced if alkylene oxides (or reactive derivatives thereof such as alkylene-halogenhydrins) are used as agents for quaternizing amino group-substituted cellulose or amino group-substituted hydrophilic water-swellable and water-insoluble copolymerizates of polyhydroxy compounds with bifunctional substances, instead of alkylhalides. By following my invention it is possible to quaternize the aforesaid amino group-substituted substances to a degree of quaternization of at least approximately 80%, and usually approximately 90%.

A further advantage obtainable according to the method according to my invention is that the quaternization reaction takes place with the formation of a hydroxyl group, whereby the hydrophility of the starting product is retained.

Suitable polyhydroxy compounds contemplated in accordance with my invention are polysaccharides such as dextran, starch, dextrin, and polyglucose; hydroxy group-containing derivatives of polysaccharides such as hydroxyethyl cellulose; polyvinylalcohol; sugar alcohols such as sorbital; and carbohydrates such as sucrose. The preferred polyhydroxy compound is dextran.

The bifunctional substances can be represented by the formula:

$$YRZ$$

wherein

R is an aliphatic radical and preferably an aliphatic hydrocarbon containing from 1–10 carbon atoms;
Y and Z each represent a member selected from the group consisting of halogen and epoxy; and
YRZ is capable of linking together the polyhydroxy compounds while forming ether linkages.

Among such bifunctional substances are included epichlorohydrin, butanediol bisepoxypropyl ether, glycerol-1,3-dichlorohydrin, and bis-epoxypropyl ether. The preferred polyhydroxy compound is epichlorohydrin.

According to my invention it is preferred to use, as the amino group-substituted hydrophilic water insoluble and swellable copolymerizates, an amino-group-substituted copolymer of dextran with epichlorohydrin. Some suitable amino group-containing substituents are diethylaminoethyl, dimethylaminoethyl, di-(hydroxyethyl) aminoethyl, beta-morpholinoethyl, 3-(diethylamino)propyl, and 2-hydroxy-3-(diethylamino) propyl. The preferred amino group containing substituents can be represented by the following formula:

$$-A-M$$

wherein

A is a member selected from the group consisting of methylene, ethylene, propylene, and 2-hydroxy propylene; and M is a member selected from the group consisting of (1) 

wherein $R_1$ and $R_2$ are each a member selected from the group consisting of alkyl containing from 1 to 3 carbon atoms; 2-hydroxy propyl; and 2-hydroxyethyl; and (2) N-$\beta$-morpholinyl.

The most preferred amino groups are diethylaminoethyl groups.

The quaternizing agents which may be used in the process of the present invention may be represented by the following general formula:

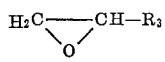

In the above formula $R_3$ is a radical selected from the group consisting of hydrogen, methyl, and ethyl.

According to the invention, propyleneoxide is the most preferred lower alkyleneoxide for the quaternization.

The preferred compounds in accordance with the present invention may be represented by the following formula:

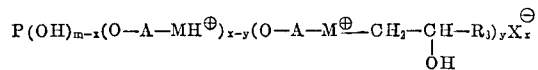

wherein

A, M and $R_3$ each have the significance noted above,

P is the hydroxyl group-free part of a polymer which has the formula $P(OH)_m$ and which is selected from the group consisting of (a) cellulose, and
(b) copolymers of
    (1) a member selected from the group consisting of polyvinyl alcohol, dextran, sorbitol, starch, hydroxyethyl cellulose, dextrin, polyglucose, and sucrose
    (2) with a bifunctional organic substance of the formula YRZ wherein R is an aliphatic radical containing from 1 to 10 carbon atoms, and Y and Z individually represent a member selected from the group consisting of halogen and epoxy, capable of linking together the aforesaid members while forming ether linkages;

$m$ is the number of hydroxyl groups, $x$ is the number of nitrogen-containing groups in the polymer, $y$ is the number of $O-A-M^{\oplus}-CH_2-CH(OH)-R_3$ groups;

The quotient $x/m$ being such as to give the substance an ion exchange capacity in the range from about 0.5 to 6 milliequivalents per gram; and the quotient $y/x$ being in the range of from about 0.8 to 1.0.

$X^{\ominus}$ is a negative salt-forming radical, such as a halide ion.

The amino group-substituted copolymerizates which are used as starting materials according to my invention can be produced by substituting copolymerizates in accordance with the teaching of the above-mentioned British patent. Examples of copolymers suitable for use as starting materials in the substitution reaction are disclosed in the U.S. Pat. 3,002,823.

The quaternization according to my invention is performed in aqueous media so that the starting material is in swollen condition in the conversion. In this way the advantage will be obtained that all ion-exchanging groups are accessible to the reaction. It has been proved that to achieve an optimal degree of quaternization, the pH should be adjusted so that only about 10-20% of the weak anion-exchanging groups exist in the free form and the main part is in protonized form. During the reaction hydroxyl ions are released to transfer protonized groups in free form which can then react with the quaternizing agent. This is evident from the following example of a reaction scheme, applicable in the case where the weak anion-exchanging groups are diethylaminoethyl groups and the quaternizing agent is propyleneoxide. R stands for the cellulose and the copolymerizate respectively.

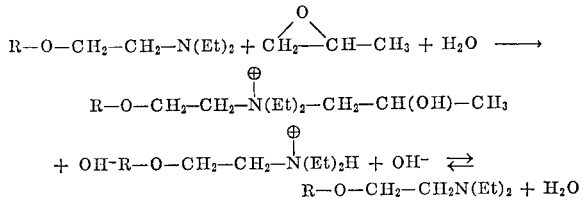

The reaction can suitably be carried out in the presence of a suspending medium consisting of a liquid immiscible with water (e.g. toluene) which is capable of dissolving the quaternizing agent and in which the swollen ion-exchangers are suspended. In this way the advantage is attained that the amount of water can be restricted to that quantity necessary in order to swell the ion exchangers. The smaller the quantity of water used the less becomes the risk of secondary reactions between the quaternizing agent and the water. Another advantage gained by using a suspending medium is that the reaction temperature can be chosen higher than the boiling point of the quaternizing agent. The contact between the swollen ion-exchanger and the quaternizing agent is also facilitated by the suspending agent.

When propyleneoxide is used as a quaternizing agent a temperature of 30–50° C. is a suitable reaction temperature and about 10–20 hours a suitable reaction time.

Subsequent to the reaction of the weak anion-exchanger with the quaternizing agent, the resulting reaction mixture is worked up by neutralization, washing with water and drying. The product may also be dewatered (with, e.g., ethanol) prior to the drying process.

The invention will be illustrated in more detail by the following examples.

EXAMPLE 1

150 g. of a copolymerizate of dextran with epichlorohydrin, having a swelling degree in water of 2.5 grams per gram and being substituted with diethylaminoethyl groups in hydrochloride form to a substitution degree corresponding to an ion-exchange capacity of 3.3 meq. per gram (DEAE—Sephadex A–25, reg. trademark) was slurried in 750 ml. of toluene. 375 ml. of water containing 3.2 g. of NaOH and 180 ml. of propyleneoxide were added with agitation. The reaction was caused to take place at 50° C. for 16 hours after which the product was neutralized with hydrochloric acid, washed with water, dewatered with ethanol and dried in a drying oven. The yield was 177 g. of a product having a total ion exchange capacity of 2.90 meq. per gram and a strong ion exchange capacity of 2.68 meq. per gram. The degree of quaternization was 92%.

EXAMPLE 2

In an experiment, carried out in a manner similar to Example 1, with 150 g. of a copolymerizate of dextran with epichlorohydrin having a swelling degree in water of 5.0 grams per gram and being substituted with diethylaminoethyl groups in hydrochloride form to a substitution degree corresponding to an ion-exchange degree of 3.3 meq. per gram (DEAE—Sephadex A–50), there were obtained 177 g. of a product having a total ion exchange capacity of 3.00 meq. per gram and a strong ion exchange capacity of 2.71 meq. per gram. The degree of quaternization was 90%.

EXAMPLE 3

15 g. of diethylaminoethyl-substituted cellulose (Whatman DE 50 powder) were slurried in 75 ml. of toluene. 50 ml. of water having 0.3 g. of NaOH dissolved therein and 18 ml. of propyleneoxide were added. The reaction was caused to take place at 50° C. for 16 hours. After working up in a way similar to that which is set forth in Example 1, 15 g. of a product having a total ion exchange capacity of 0.60 meq. per gram and a strong ion exchange capacity of 0.49 meq. per gram were obtained. The degree of quaternization was 82%.

In order to verify the usability of the novel products for chromatography under alkaline conditions, they were subjected to titration tests with hydrochloric acid, the milliequivalents of HCl consumed by the ion exchanger having been plotted against the pH.

In conclusion, while the foregoing specification and drawing describe the construction, operation and use of one preferred embodiment of the instant invention, it is to be understood that I do not intend to limit myself to the precise constructions and arrangements herein disclosed, since the various details of construction, form and arrangement may obviously be varied to a considerable extent by anyone skilled in the art without really departing from the basic principles and novel teachings of this invention and without sacrificing any of the advantages of the invention, and accordingly, it is intended to encompass all changes, variations, modifications and equivalents falling within the scope of the appended claims.

What is claimed is:
1. The method which comprises reacting together
   (a) a starting material selected from the group of
       (1) tertiary amino-group substituted cellulose, and
       (2) tertiary amino group substituted hydrophilic, water swellable and insoluble copolymers of
           (A) a member selected from the group consisting of polyvinyl alcohol, dextran, sorbitol, starch, hydroxyethyl cellulose, dextrin, polyglucose, and sucrose with
           (B) a bifunctional organic substance of the formula YRZ wherein
               R is an aliphatic radical containing from 1 to 10 carbon atoms, and Y and Z individually represent a member selected from the group consisting of halogen and epoxy, capable of linking together the aforesaid members while forming ether linkages, and
   (b) a lower alkylene oxide,
   said reaction being carried out in aqueous medium so that said starting material is in swollen condition, the tertiary amino ion exchange groups existing partly in the free form and partly in the protonized form, the main part being in the protonized form, and recovering products having a degree of quaternization of at least 80%.

2. The method of claim 1 wherein the pH is adjusted during the reaction so that about 10–20% of the weak anion-exchanging groups exist in the free form and the remainder exist in the protonized form.

3. The method as set forth in claim 1 wherein the tertiary amino group-substituted copolymer is a tertiary amino group substituted copolymer of dextran with epichlorohydrin.

4. The method as set forth in claim 3 wherein the tertiary amino group-containing substituent is a diethylaminoethyl group.

5. The method as set forth in claim 4 wherein the lower alkylene oxide is propylene oxide.

6. The method as set forth in claim 1 wherein the tertiary amino group-containing substituent is a diethylaminoethyl group.

7. The method as set forth in claim 1 wherein the alkylene oxide is propylene oxide.

References Cited

UNITED STATES PATENTS

| | | | |
|---|---|---|---|
| 2,663,702 | 12/1953 | Kropa | 260—88.1 |
| 2,689,832 | 9/1954 | Hwa | 260—2.1 |
| 2,725,361 | 11/1955 | Hwa | 260—2.1 |
| 3,277,025 | 10/1966 | Flodin et al. | 260—2.1 |

FOREIGN PATENTS

| | | |
|---|---|---|
| 936,039 | 9/1963 | Great Britain. |

OTHER REFERENCES

Cram and Hammond, Organic Chemistry, McGraw-Hill, New York, 1959 (pp. 213–14).

Amberlite Ion Exchange Resins Laboratory Guide, Rohm & Haas, Philadelphia, 1964 (p. 18).

MELVIN GOLDSTEIN, Primary Examiner

U.S. Cl. X.R.

260—2.1 R, 2.1 E, 232